United States Patent
Sylvain (10) Patent No.: US 7,512,381 B1
(45) Date of Patent: Mar. 31, 2009

(54) MONITORING MOBILE TERMINALS VIA LOCAL WIRELESS ACCESS POINTS

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 506 days.

(21) Appl. No.: 10/967,700

(22) Filed: Oct. 15, 2004

(51) Int. Cl.
*H04B 7/00* (2006.01)

(52) U.S. Cl. ............... 455/66.1; 455/426.1; 455/435.2; 455/552.1; 455/41.2; 455/404.2; 455/456.1; 455/436; 370/280; 370/338; 370/312; 370/401

(58) Field of Classification Search ............... 455/66.1, 455/426.1, 432.2, 552.1, 403, 404.2, 436, 455/456.1, 437, 41.2; 370/280, 338, 312, 370/401
See application file for complete search history.

(56) References Cited

U.S. PATENT DOCUMENTS

| | | | | |
|---|---|---|---|---|
| 5,613,205 A * | 3/1997 | Dufour | ....................... | 455/440 |
| 6,061,337 A * | 5/2000 | Light et al. | ................. | 370/331 |
| 6,073,016 A * | 6/2000 | Hulthen et al. | ........... | 455/435.2 |
| 6,104,712 A * | 8/2000 | Robert et al. | ............... | 370/389 |
| 6,151,628 A * | 11/2000 | Xu et al. | ...................... | 709/225 |
| 6,185,412 B1 * | 2/2001 | Pentikainen et al. | ..... | 455/404.1 |
| 6,192,029 B1 * | 2/2001 | Averbuch et al. | ............ | 370/229 |
| 6,201,962 B1 * | 3/2001 | Sturniolo et al. | ......... | 455/432.2 |
| 6,226,528 B1 * | 5/2001 | son .ANG.kerberg et al. | ........................ | 455/426.1 |
| 6,230,008 B1 * | 5/2001 | Garcia Pedraja et al. | . | 455/426.1 |
| 6,243,581 B1 * | 6/2001 | Jawanda | ................... | 455/432.2 |
| 6,272,129 B1 * | 8/2001 | Dynarski et al. | ............ | 370/356 |
| 6,631,263 B1 * | 10/2003 | Corkery | ....................... | 455/436 |
| 6,795,421 B1 * | 9/2004 | Heinonen et al. | ........... | 370/338 |
| 6,839,560 B1 * | 1/2005 | Bahl et al. | ................ | 455/456.1 |
| 6,847,625 B2 * | 1/2005 | Heinonen et al. | ........... | 370/338 |
| 6,865,395 B2 * | 3/2005 | Riley | ........................ | 455/456.1 |
| 6,947,753 B2 * | 9/2005 | Bayder | ..................... | 455/456.1 |
| 6,970,443 B2 * | 11/2005 | Dynarski et al. | ............ | 370/338 |
| 7,103,313 B2 * | 9/2006 | Heinonen et al. | .......... | 455/41.2 |
| 7,126,937 B2 * | 10/2006 | Crosbie et al. | .............. | 370/350 |
| 7,139,583 B2 * | 11/2006 | Yamasaki et al. | ......... | 455/456.1 |
| 7,152,238 B1 * | 12/2006 | Leung et al. | .................... | 726/2 |
| 7,203,183 B2 * | 4/2007 | Cromer et al. | .............. | 370/338 |
| 7,221,928 B2 * | 5/2007 | Laird et al. | ............... | 455/404.1 |
| 7,257,105 B2 * | 8/2007 | Molteni et al. | .............. | 370/338 |
| 7,289,465 B2 * | 10/2007 | Kuan et al. | .................. | 370/328 |
| 7,342,876 B2 * | 3/2008 | Bellur et al. | ................ | 370/221 |
| 7,355,996 B2 * | 4/2008 | Hrastar | ....................... | 370/328 |
| 7,356,001 B1 * | 4/2008 | Jones et al. | ................. | 370/331 |

* cited by examiner

*Primary Examiner*—Marceau Milord
(74) *Attorney, Agent, or Firm*—Withrow & Terranova, P.L.L.C.

(57) ABSTRACT

The present invention allows an application to access a local wireless access point to monitor the status of a mobile terminal. The status of the mobile terminal bears on the relative presence or location of the mobile terminal with respect to a local wireless access point or an ability of the mobile terminal to communicate via the local wireless access point. When the status bears on the ability of the mobile terminal to communicate with a local wireless access point, the status may relate to signal strengths, bit rates, or locations associated with the local wireless communications between the mobile terminal and the local wireless access point.

41 Claims, 7 Drawing Sheets

FIG. 6

MONITORING MOBILE TERMINALS VIA LOCAL WIRELESS ACCESS POINTS

FIELD OF THE INVENTION

The present invention relates to communications, and in particular to monitoring the status of mobile terminals operating in a local wireless communication environment via local wireless access points.

BACKGROUND OF THE INVENTION

Given the extensive acceptance and flexibility of packet networks, there is a movement to support voice communications over packet networks, in addition to the various media applications that dominate packet-based communications. Access to these packet networks is often afforded through local wireless communications, such as communications using Bluetooth, the IEEE 802.11, and wireless local area network (WLAN) technologies. Local wireless access is generally provided through an appropriately configured access point, which is capable of supporting local wireless communications with a properly configured mobile terminal, which may take the form of a mobile telephone, personal digital assistant, or personal computer.

To facilitate local wireless communications, there are generally numerous local wireless access points spread throughout a geographic area that the mobile terminal may use to gain access to the packet network. As such, it is necessary to track the relative location of the mobile terminals or their ability to communicate with a particular local wireless access point, such that the mobile terminal may participate in communication sessions initiated by the mobile terminal or by a third party. As such, there is a need to determine whether the local wireless access points are supporting or can support local wireless communications with the mobile terminal, if another access point should be handling the communications, or if communications should be handed off to a cellular connection, separate from the local wireless access environment. These determinations often rely on the mobile terminal registering or unregistering with the packet network in association with the serving local wireless access point or its ability to establish communications with the packet network through a local wireless access point. Unfortunately, relying on the communication ability of the mobile terminal is problematic, because channel conditions may change quickly or the mobile terminal may move outside of a local wireless communication range in a fashion disrupting the ability of the mobile terminal to register, unregister, or otherwise provide information bearing on the ability of the mobile terminal to establish communications via the local wireless access point.

Accordingly, there is a need for a technique to monitor the status of a mobile terminal without relying on the ability of the mobile terminal to communicate with the packet network via a local wireless access point. The status of the mobile terminal may bear on the mobile terminal's location, presence within a local wireless communication zone, or communication information such as signal strengths, bit rates, or locations. There is a further need to provide the status information to applications used for communication sessions with the mobile terminal, such that communications with the mobile terminal may be more effectively and efficiently directed and controlled.

SUMMARY OF THE INVENTION

The present invention allows an application to access a local wireless access point to monitor the status of a mobile terminal. The status of the mobile terminal bears on the relative presence or location of the mobile terminal with respect to a local wireless access point or an ability of the mobile terminal to communicate via the local wireless access point. When the status bears on the ability of the mobile terminal to communicate with a local wireless access point, the status may relate to signal strengths, bit rates, or location associated with the local wireless communications between the mobile terminal and the local wireless access point.

The application, which runs on a device on a packet network, will send a request for status information to the local wireless access point, which is configured to determine the status of the mobile terminal and provide corresponding status information to the application. The application can process the status information for the mobile terminal and take appropriate action, such as determining how to process communications involving the mobile terminal. Such processing may include controlling how to initiate, terminate, route, or transfer communication sessions involving the mobile terminal, regardless of whether they are to be initiated via the local wireless point from which the status information was received.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides for monitoring the status of a mobile terminal via a local wireless access point. The status of the mobile terminal bears on the relative presence or location of the mobile terminal or an ability of the mobile terminal to communicate via one or more of the local wireless access points. When the status bears on the ability of the mobile terminal to communicate with a local wireless access point, the status may particularly bear on signal strength, bit rates, or locations associated with the local wireless communications between the mobile terminal and the local wireless access point.

An application running on a device of the packet network to which the local wireless access points provide access is configured to obtain the status of the mobile terminal in the form of status information directly from the local wireless access points. The local wireless access points are configured to determine the status of the mobile terminal based on communications or lack thereof involving the mobile terminal and the local wireless access point. The application can process the status information for the mobile terminal retrieved from the local wireless access points to determine how to process communications involving the mobile terminal. Such processing may include controlling how to initiate, terminate, route, or transfer communication sessions involving the mobile terminal, regardless of whether they are to be initiated via the local wireless access point from which the status information was received.

Figure 1:
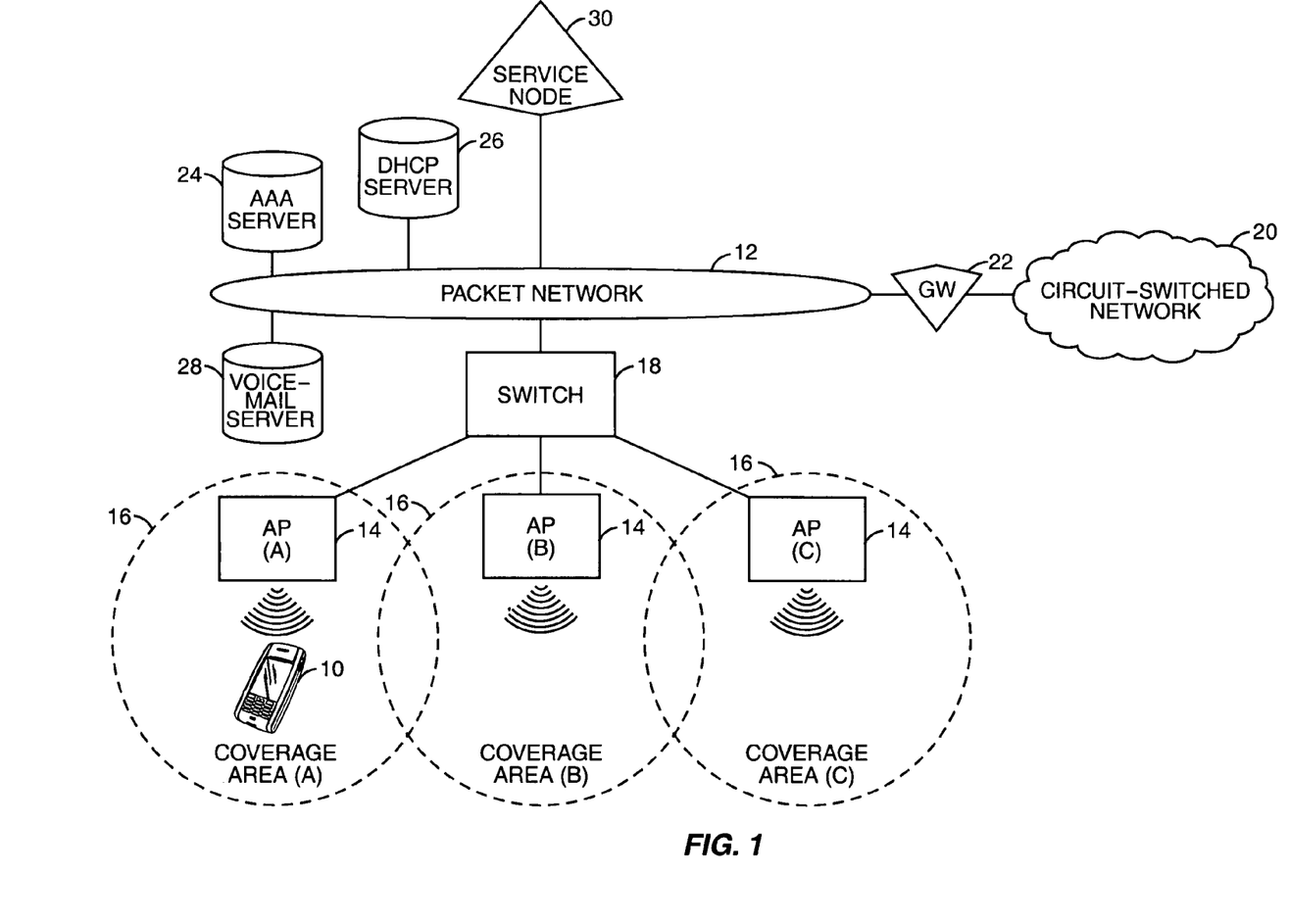
FIG. 1 is a block representation of a communication environment according to a first embodiment of the present invention.

Turning now to FIG. 1, a local wireless communication environment is illustrated according to one embodiment of the present invention. The local wireless communication environment allows a mobile terminal 10 to establish communication sessions over a packet network 12 with other telephony devices via one or more local wireless access points (APs) 14. The local wireless access points 14 support local wireless communications using Bluetooth, the IEEE's 802.11, or other wireless local area network (WLAN) technologies to support local wireless communications over limited coverage areas 16. These coverage areas 16 may be separate from one another or may overlap one another in whole or in part. As illustrated, coverage area 16(A) overlaps coverage area 16(B), and coverage area 16(B) overlaps coverage area 16(C). Each of the local wireless access points 14(A, B, and C) is connected to a switch 18, which connects to the packet network 12 in traditional fashion.

The packet network 12 may connect to other types of networks, including a circuit-switched network 20, such as the Public Switched Telephone Network (PSTN) through a gateway (GW) 22. The gateway 22 will facilitate bidirectional interworking between packet based and circuit-switched communications, as will be appreciated by those skilled in the art. The packet network 12 may support any number of communication clients, including telephony terminals, data and media clients, and any number of servers. These servers may include authorization, authentication, and accounting (AAA) servers 24, Dynamic Host Control Protocol (DHCP) servers 26, and voicemail servers 28. Other servers may include web servers, domain name service (DNS) servers, and other servers used for providing content or controlling communication sessions or data flow (not illustrated).

Any number of entities associated with the packet network 12 may be involved with communications with the mobile terminal 10 and would benefit from having access to the status of the mobile terminal 10 with respect to the mobile terminal's ability to communicate with a particular local wireless access point 14 or the relative location or presence of the mobile terminal 10 with respect to a local wireless access point 14. The status information is often beneficial in determining how to process communication sessions, such as voice-over-packet (VoP) telephony calls, involving the mobile terminal 10.

For the present invention, the local wireless access points 14 will monitor communication-related information with respect to the mobile terminals 10 that are within the respective coverage areas 16 to create status information. The status information is provided to an interested application upon request or on a periodic basis. For conciseness and clarity, assume that a service node 30 is a generic entity capable of running an application for which the status information is beneficial.

Figure 2:
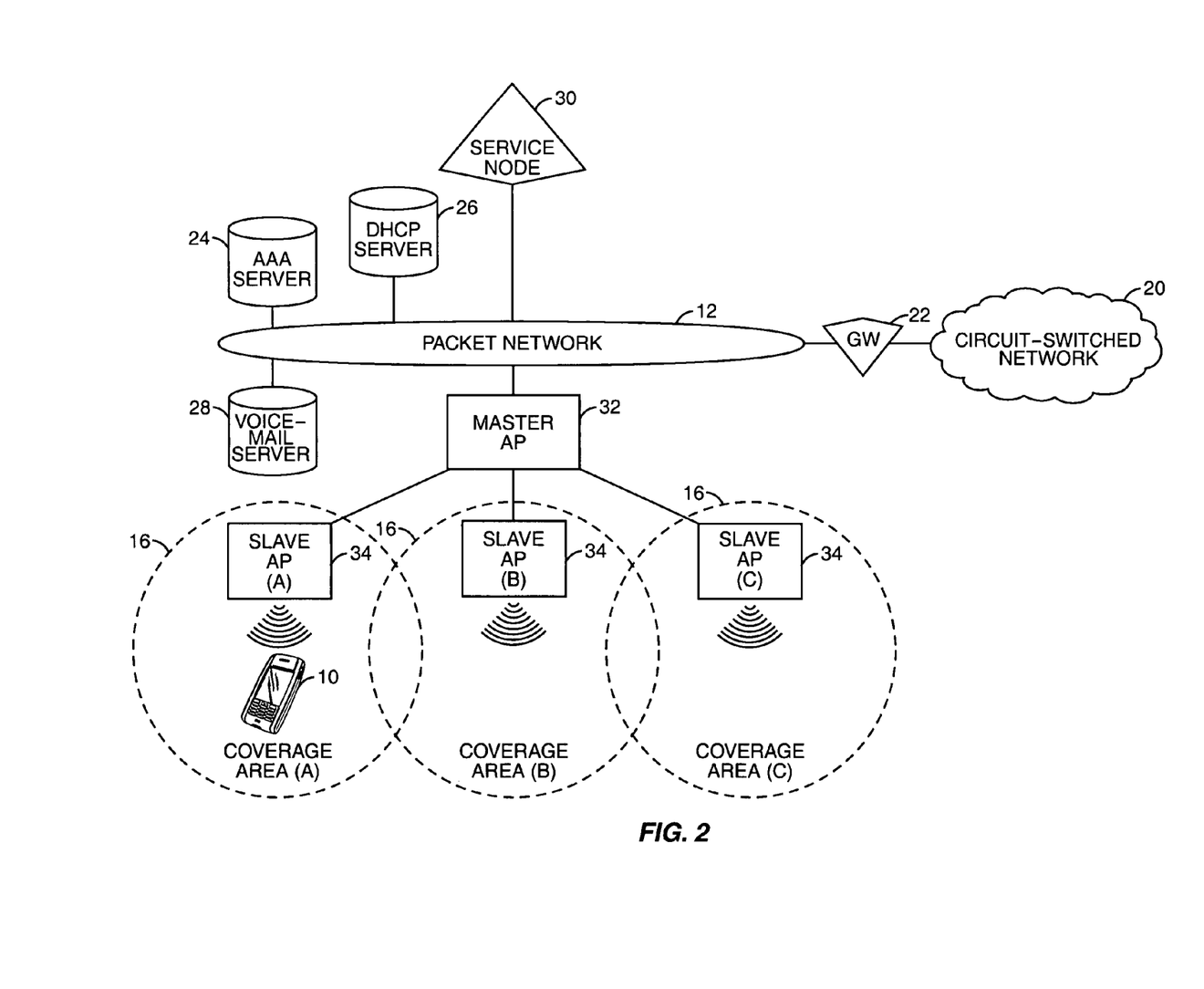
FIG. 2 is a block representation of a communication environment according to a second embodiment of the present invention.

Turning now to FIG. 2, a second local wireless communication environment is illustrated. In this environment, the functionality of the local wireless access points is distributed amongst a master access point 32 and slave access points 34. In essence, the slave access points 34 provide the local wireless interface, wherein the primary processing and control functions are provided in the master access point 32. As such, the master access point 32 will provide the requisite collaboration of the slave access points 34 for facilitating a single interface to the packet network 12. The service node 30 will receive status information for the mobile terminal 10 in one of the coverage areas 16 of the slave access points 34 from the master access point 32. The master access point 32 will interact with the slave access points 34 to monitor the status of the mobile terminal 10 to determine the status information, which will be provided to the service node 30 on a periodic basis or upon request.

Figure 3A:
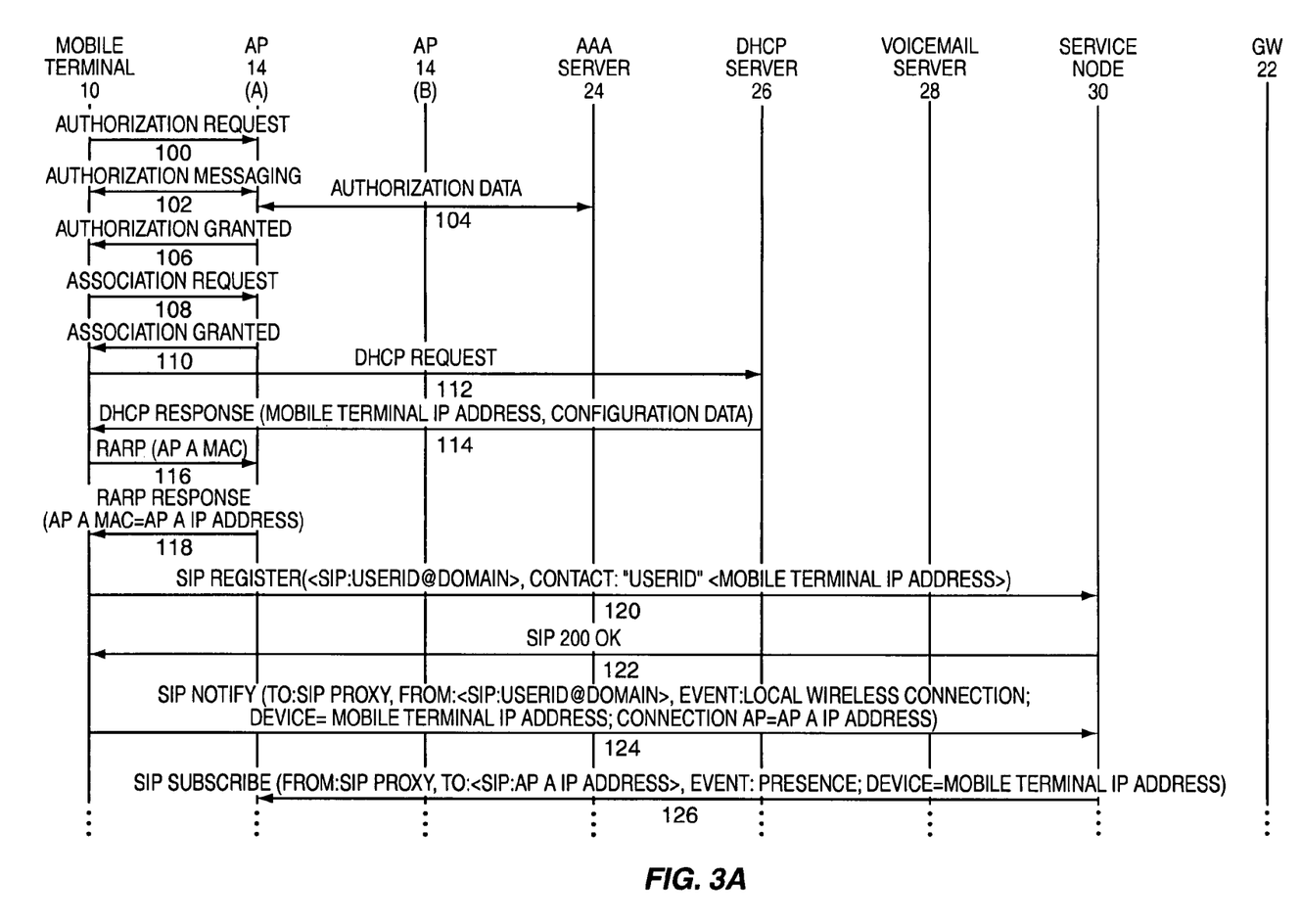
FIGS. 3A-3C are a communication flow illustrating an exemplary scenario for monitoring the status of a mobile terminal via a local wireless access point according to one embodiment of the present invention.
Figure 3B:
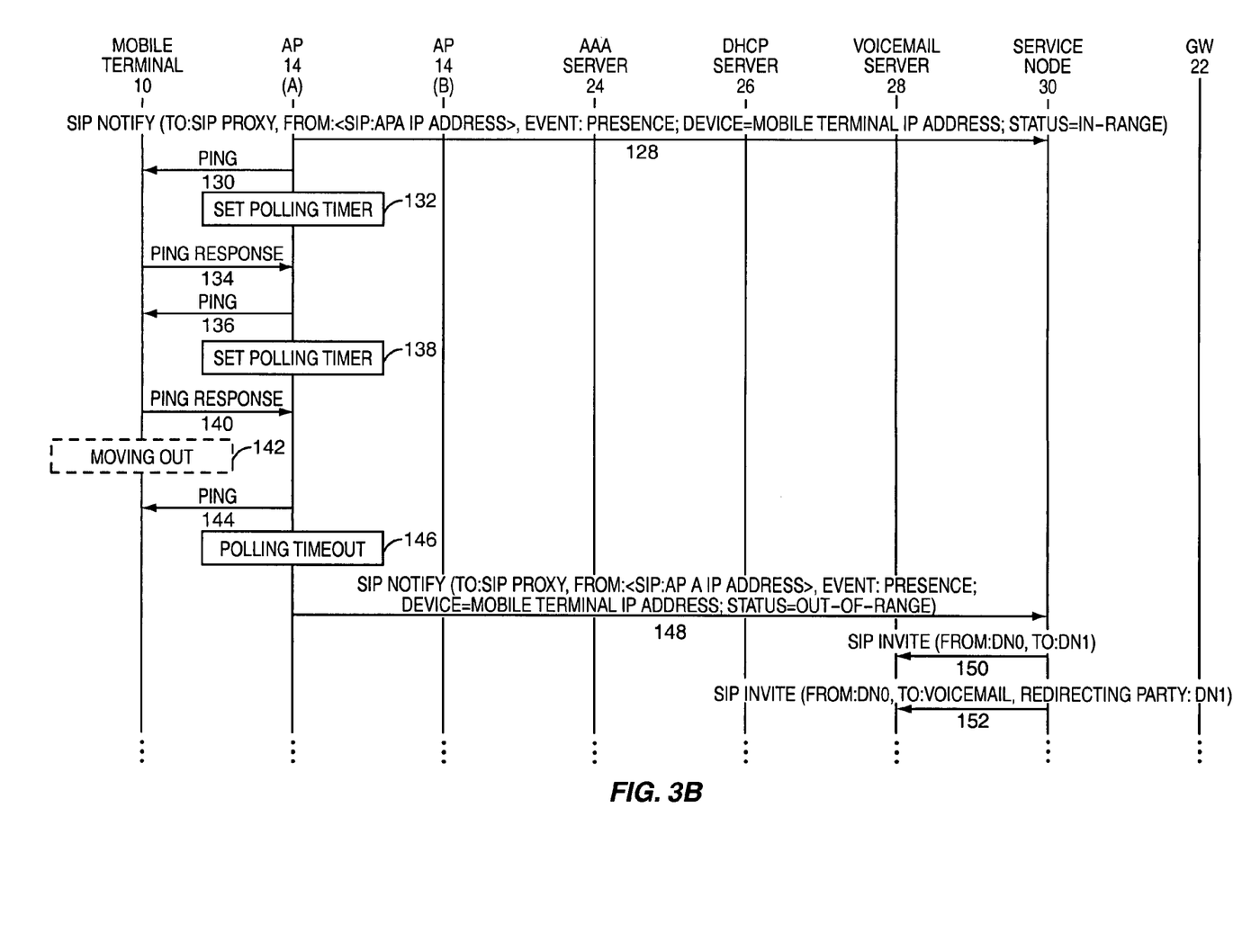
Figure 3C:
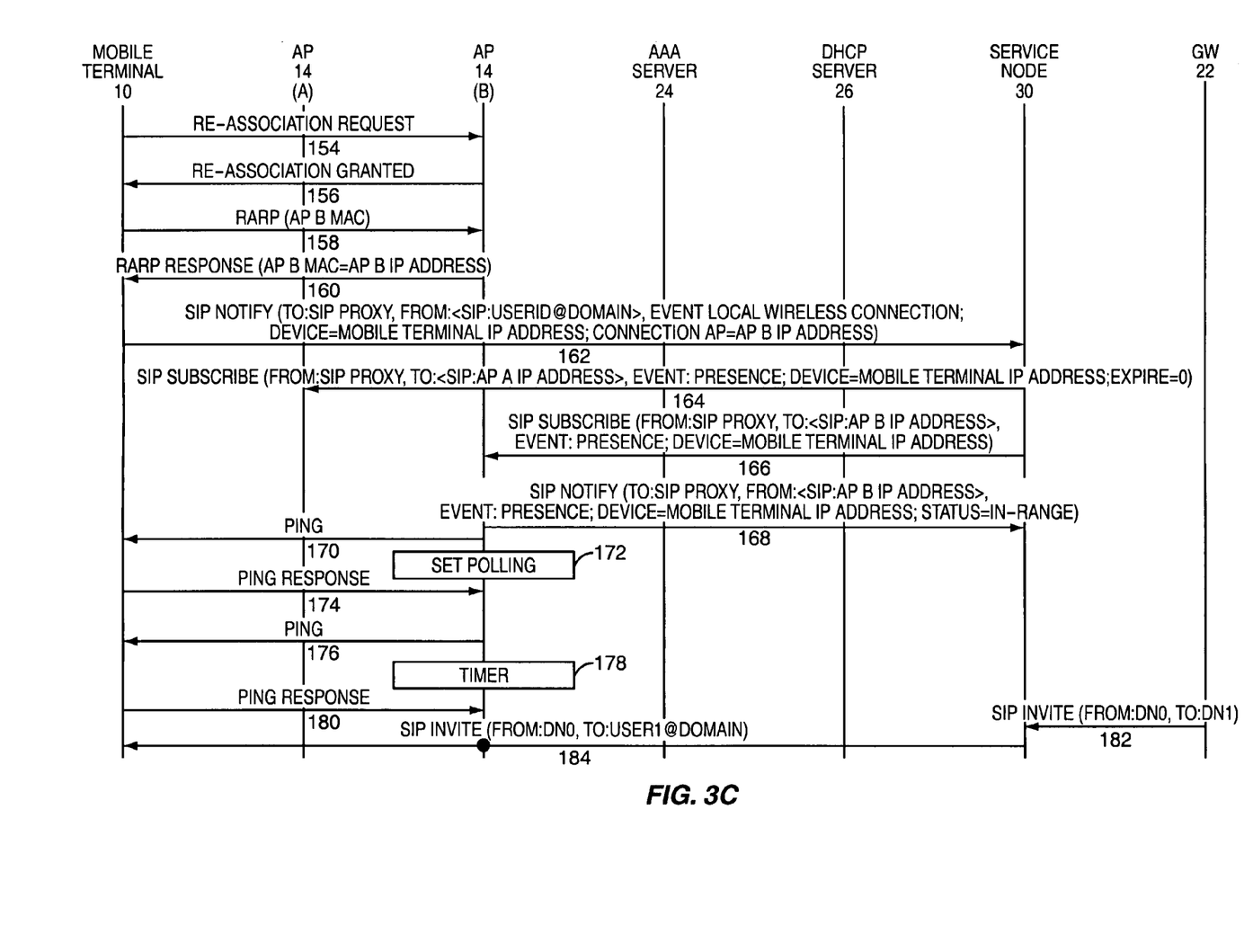

Turning now to FIGS. 3A-3C, an exemplary communication flow is provided wherein the status of the mobile terminal 10 is monitored via local wireless access point 14A, and after a handoff to local wireless access point 14B, the status of the mobile terminal 10 is monitored via local wireless access point 14B. Assume that the service node 30 is running an application that is configured to interact with local wireless access points 14A and 14B, as necessary, to obtain status information associated with the mobile terminal 10. The status information is derived from the relative presence, location, communication ability, or a combination thereof of the mobile terminal 10.

Initially, assume the mobile terminal 10 moves within coverage area 16A afforded by local wireless access point 14A. When within communication range, the mobile terminal 10 will send an authorization request to local wireless access point 14A to obtain authorization to gain access to the packet network 12 via local wireless access point 14A (step 100). The mobile terminal 10 and local wireless access point 14A may exchange authorization messages to obtain the requisite information from the mobile terminal 10 for authorization (step 102). Local wireless access point 14A may interact with the AAA server 24 to obtain authorization for the mobile terminal 10 (step 104). Assuming the mobile terminal 10 is authorized, a message indicating the authorization was granted is sent back to the mobile terminal 10 from local wireless access point 14A (step 106). During this process, local wireless access point 14A may provide the mobile terminal 10 with the Machine Address Code (MAC) address for local wireless access point 14A.

Next, the mobile terminal 10 will attempt to associate itself with local wireless access point 14A and send an association request to local wireless access point 14A (step 108). The request will be processed, and assuming it is approved, local wireless access point 14A will send a message back to the mobile terminal 10 indicating the association is granted (step 110). At this point, the mobile terminal 10 has access to the packet network 12 via local wireless access point 14A, and is associated with local wireless access point 14A.

The mobile terminal 10 may then access the DHCP server 26 to obtain an IP address to identify itself to the packet network 12. As such, a DHCP request is sent from the mobile terminal 10 to the DHCP server 26 (step 112), which will respond with the mobile terminal's IP address and any requisite configuration data to use for identifying itself or establishing communications with other entities over the packet network 12 (step 114). Next, the mobile terminal 10 may obtain the IP address (AP A IP ADDRESS) for local wireless access point 14A. In one embodiment, a Reverse Address Resolution Protocol (RARP) message identifying the MAC address for access point 14A is sent to local wireless access point 14A (step 116), which will respond by providing its IP address back to the mobile terminal 10 in an RARP Response message (step 118).

At this point, the mobile terminal 10 may register with the service node 30, or with the application running thereon, to identify itself to the service node 30 as being ready for communications. If the Session Initiation Protocol (SIP) is used, a SIP Register message may be sent to the service node 30 to effect registration (step 120). The SIP Register message may include the SIP address for the user of the mobile terminal 10 (USERID@DOMAIN) and contact information, which may include a general name such as "USERID" as well as the mobile terminal's IP address. The service node 30 will register the mobile terminal 10 and send a registration response back in the form of a SIP 200 OK message (step 122). Next, the mobile terminal 10 can provide the service node 30 with the IP address (AP A IP ADDRESS) of local wireless access point 14A in a SIP Notify message (step 124). The SIP Notify message may also identify the IP address for the mobile terminal 10, as well as the SIP address associated with the mobile terminal 10. Other information, such as indicia indicating that the mobile terminal 10 is communicating via a local wireless connection may be provided to the service node 30. Those skilled in the art will recognize other information beneficial to the service node 30 or a controlling application that may be received from the mobile terminal 10.

Since the service node 30 knows that the mobile terminal 10 is properly registered and being supported by local wireless access point 14A, the service node 30 may request status information related to the mobile terminal 10 from local wireless access point 14A. In the illustrated embodiment, a SIP Subscribe message is sent to local wireless access point 14A to request status information, in this case the relative presence of the mobile terminal 10 with respect to local wireless access point 14A, from local wireless access point 14A (step 126). The SIP Subscribe message may be sent to the IP address for local wireless access point 14A and identify the mobile terminal 10 using the mobile terminal's IP address. In this example, the service node 30 also acts as a SIP proxy and will be associated with an IP address (SIP PROXY). Local wireless access point 14A will provide any status information in response to the SIP Subscribe message back to the service node 30 in a SIP Notify message (step 128). Since the original request from the service node 30 pertained to the relative presence of the mobile terminal 10 with respect to local wireless access point 14A, the SIP Notify message will provide such presence information. In this case, the status information will indicate that the mobile terminal 10 is within range of local wireless access point 14A, and as such is within coverage area 16A based on any type of criteria monitored or measured with respect to communications involving the mobile terminal 10 with respect to local wireless access point 14A. As such, the service node 30 has obtained status information for the mobile terminal 10 from local wireless access point 14A.

Continuing with the example, assume a periodic polling routine is used by local wireless access point 14A to determine whether the mobile terminal 10 is within communication range. As such, a Ping message may be sent toward the mobile terminal 10 (step 130) and a polling timer may be set (step 132). The polling timer defines a set period of time within which a response to the Ping message should be received from the mobile terminal 10. Assume that a Ping Response message is provided back to local wireless access point 14A from the mobile terminal 10 in response to the Ping message (step 134). Further assume a successful polling is repeated (steps 136-140). At this point, assume the mobile terminal 10 moves out of communication range with local wireless access point 14A, and thus, leaves coverage area 16A (step 142). As such, the mobile terminal 10 will not receive the next Ping message sent from local wireless point 14A (step 144), and the polling timer will timeout (step 146). Assuming local wireless access point 14A is configured to notify the service node 30 of changes in the relative presence of the mobile terminal 10 with respect to local wireless access point 14A, local wireless access point 14A will send a SIP Notify message to the service node 30 indicating that the mobile terminal 10 has moved out of communication range with local wireless access point 14A (step 148). If a subsequent SIP Invite message to initiate a communication session with the mobile terminal 10 via local wireless point 14A is received (step 150), the service node 30, acting as a proxy for communication sessions with the mobile terminal 10, will recognize that communications with the mobile terminal 10 are not possible and will forward the SIP Invite message to the voicemail server 28 (step 152). The original SIP Invite message may identify the directory numbers associated with the calling and called parties, directory numbers DN1 and DN0, respectively. The service node 30 will be able to associate the directory number DN0 for the mobile terminal 10 with the appropriate SIP address, if necessary. Further, the SIP Invite message sent to the voicemail server 28 will indicate that the SIP Invite message was redirected from the calling party.

Assume that the mobile terminal 10 moves into communication range, and thus coverage area 16B, of local wireless access point 14B. The mobile terminal 10 is already registered with the service node 30, but will need to re-associate itself with a new access point, local wireless access point 14B. As such, a Re-association Request is sent to local wireless access point 14B (step 154), which may grant the re-association request and send an appropriate message back to the mobile terminal 10 (step 156). The Re-Association Response may include the MAC address for local wireless access point 14B. The mobile terminal 10 may use the MAC address for local wireless access point 14B to obtain the IP address (AP B IP ADDRESS) for local wireless access point 14B. In the illustrated embodiment, an RARP Request with the MAC address for local wireless access point 14B is sent to local wireless access point 14B (step 158), which will respond with the IP address for local wireless access point 14B (step 160).

Again, the mobile terminal 10 will send a SIP Notify message to alert the service node 30 that it is available for communications via a local wireless connection, and will include the IP address for local wireless access point 14B (step 162). The service node 30 will recognize that the serving local wireless access point 14 has changed from local wireless access point 14A to local wireless access point 14B, and will take the necessary steps to notify both of the local wireless access points 14A and 14B of the change. In particular, the service node 30 will unsubscribe to receiving presence updates from local wireless access point 14A using a SIP Subscribe message (step 164) and will subscribe to receive presence updates from local wireless access point 14B using a SIP Subscribe message (step 166). The subscriptions are made possible because the service node 30 is aware of the local wireless access point 14 supporting the mobile terminal 10, as well as the IP address thereof. In response to receiving the SIP Subscribe message from the service node 30, local wireless access point 14B will send a SIP Notify message providing status information for the mobile terminal 10, with respect to local wireless access point 14B (step 168). In this case, the status information provided from local wireless access point 14B indicates that the mobile terminal 10 is within communication range of local wireless access point 14B. The service node 30 will note the status information and take the necessary steps to facilitate or control communications with the mobile terminal 10.

In the meantime, local wireless access point 14B will initiate polling of the mobile terminal 10 (steps 170-180). When a request to initiate a session with the mobile terminal 10 through the packet network 12 is received by the service node 30, the session can be directed to the mobile terminal 10 via local wireless access point 14B. As illustrated, a SIP Invite message is received at the service node 30 from the gateway 22 in response to a call originating on the circuit-switched network 20 (step 182). The SIP Invite message is used to request establishment of a packet session with the mobile terminal 10 from the gateway 22. The SIP Invite will be received by the service node 30 in a SIP proxy capacity (step 182) and forwarded to the mobile terminal 10 via local wireless access point 14B (step 184). The service node 30 will identify the calling party as being associated with directory number DN0 and will use the IP address for the user to send the SIP Invite message to the mobile terminal 10. The service node 30 will associate the directory number associated with the mobile terminal 10 with the IP address of the user to effectuate the communication session.

Figure 4:
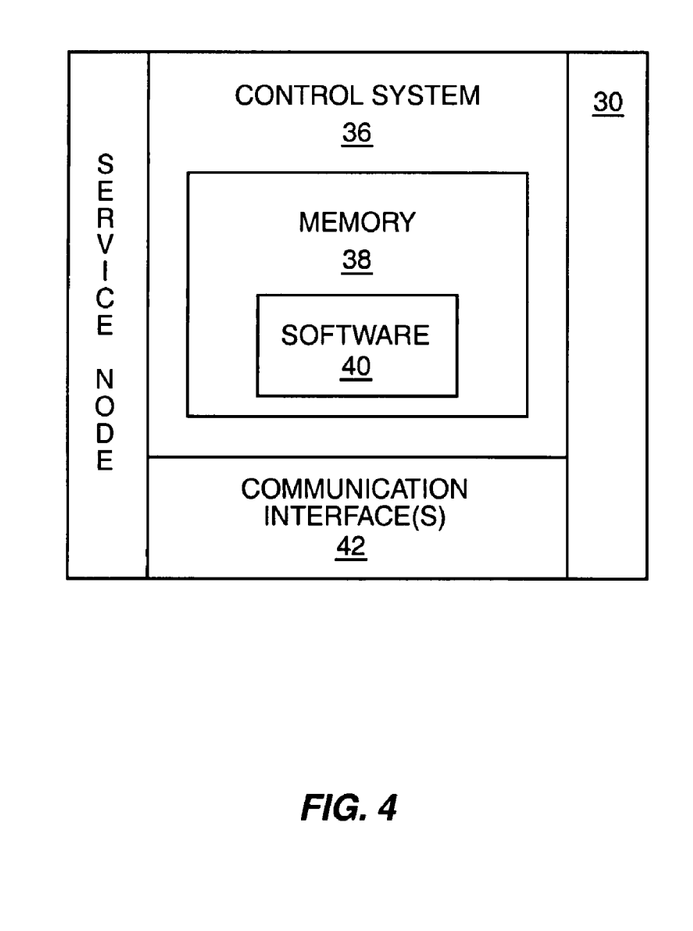
FIG. 4 is a block representation of a service node according to one embodiment of the present invention.

With reference to FIG. 4, a block representation of a service node 30 is illustrated according to one embodiment of the present invention. The service node 30 will include a control system 36 having memory 38 for the software 40 and requisite data to operate as described above. The control system 36 will include one or more communication interfaces 42 to facilitate communications with various entities over the packet network 12.

Figure 5:
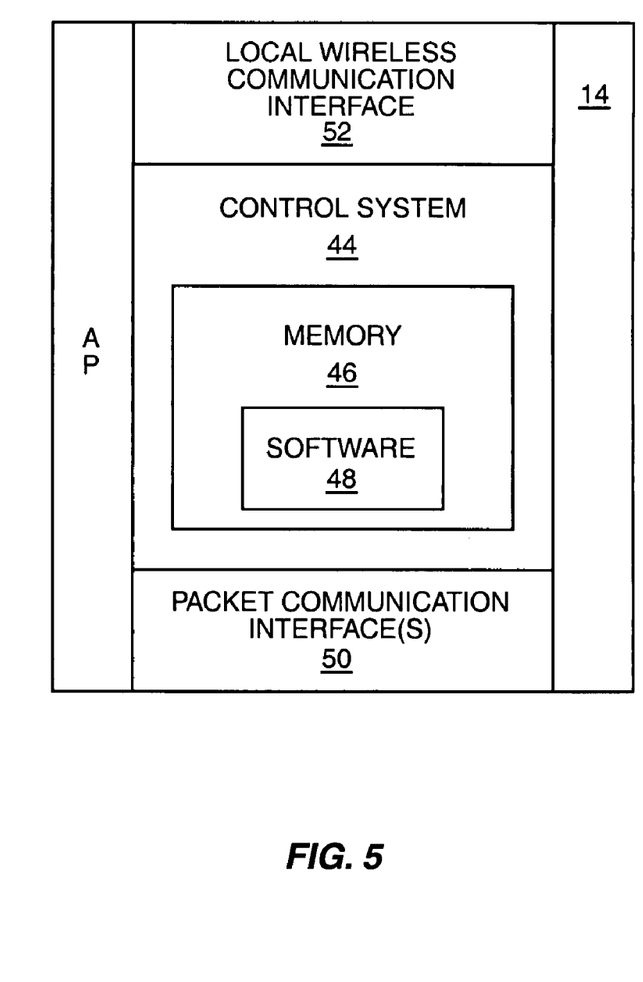
FIG. 5 is a block representation of an access point according to one embodiment of the present invention.

A block representation of a local wireless access point 14 is illustrated in FIG. 5. The local wireless access point 14 will include a control system 44 having memory 46 with sufficient software 48 and data to operate as described above. The control system 44 will be associated with one or more packet communication interfaces 50 for facilitating communications over the packet network 12, as well as a local wireless communication interface 52 for facilitating local wireless communications with the mobile terminal 10 or other local wireless communication terminals. The control system 44 will facilitate the requisite interworking to allow the local wireless access point 14 to effectively act as a gateway between the local wireless coverage area 16 and the packet network 12.

Figure 6:
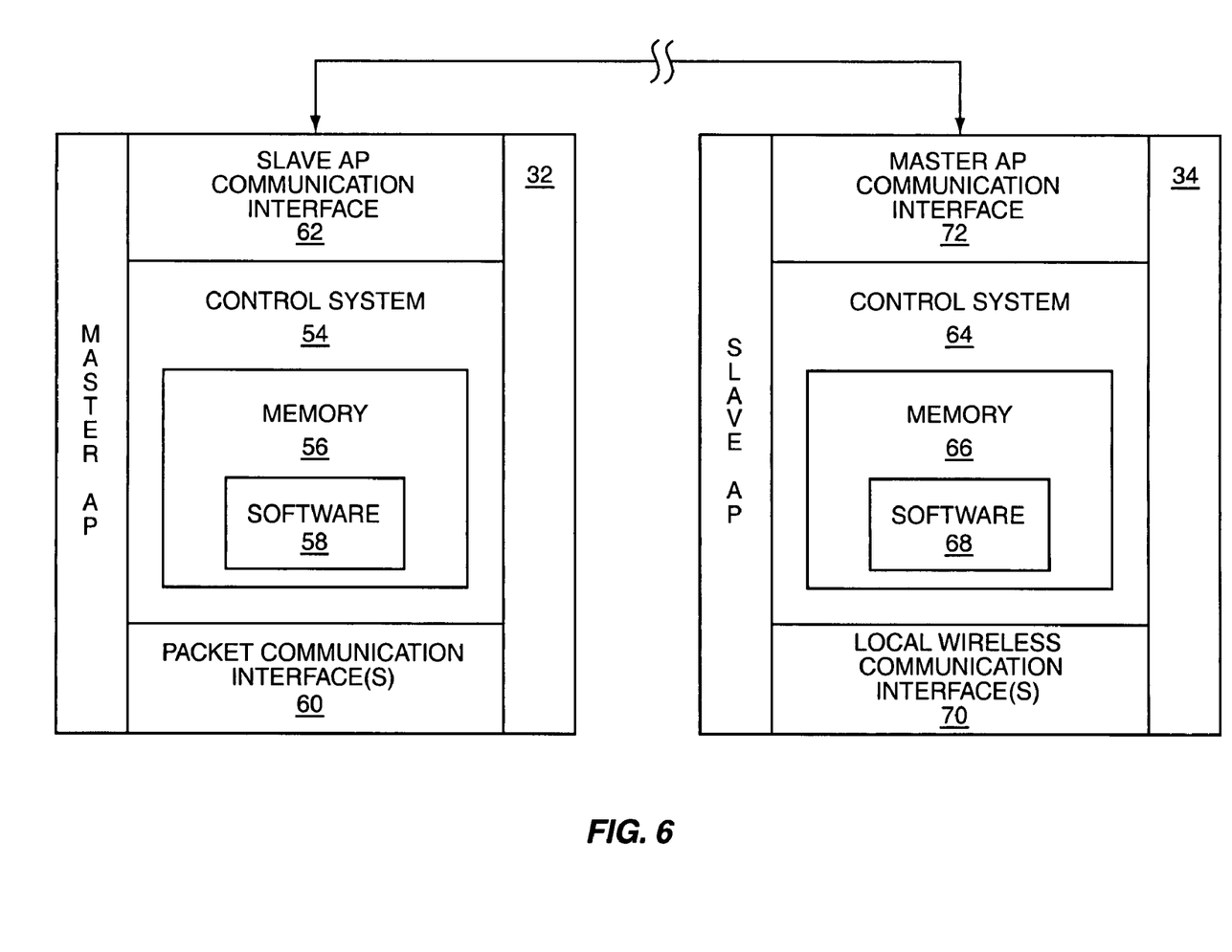
FIG. 6 is a block representation of master and slave access points according to one embodiment of the present invention.

With reference to FIG. 6, a block representation of a master access point 32 and a slave access point 34 is provided. In essence, the master access point 32 will include a control system 54 with memory 56 for the software 58 and data necessary to operate as a master for the slave access point 34. The control system 54 will include at least one packet communication interface 60 to facilitate communications over the packet network 12, as well as a slave access point communication interface 62, which will facilitate communications with the slave access point 34. These communications may be wired or wireless. The primary control functionality will be provided by the control system 54, wherein the slave access points 34 will effectively act as local wireless interfaces for the master access point 32. The master access point 32 will generally support multiple slave access points 34.

The slave access point 34 will have a more modest control system 64 with memory 66 to store the requisite software 68 and data to operate as a slave access point 34, and in particular, to facilitate bidirectional communications between the master access point 32 and the mobile terminal 10 or other local wireless communication devices. As such, the control system 64 will include a local wireless communication interface 70 to facilitate local wireless communications with the mobile terminal 10, and a master access point communication interface 72 to interface with the slave access point communication interface 62 of the master access point 32.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   at least one packet communication interface to facilitate communication over a packet network; and
   a control system associated with the at least one packet communication interface and adapted to:
   run an application associated with communications involving a mobile terminal whose access to the packet network may be provided by a local wireless access point;
   send to the local wireless access point a request for status information bearing on an ability of the mobile terminal to communicate via the local wireless access point; and
   receive the status information from the local wireless access point.

2. The system of claim 1 wherein the request identifies the mobile terminal, and wherein the local wireless access point is able to support local wireless communications with a plurality of mobile terminals at any given time.

3. The system of claim 1 wherein the request instructs the local wireless access point to provide current status information.

4. The system of claim 1 wherein the request instructs the local wireless access point to provide the status information when the status information changes.

5. The system of claim 1 wherein the local wireless access point affords a coverage area in which local wireless communications with the mobile terminal are viable and the status information indicates whether the mobile terminal is within the coverage area.

6. The system of claim 1 wherein the status information indicates whether the mobile terminal is within communication range of the local wireless access point.

7. The system of claim 1 wherein the status information provides a signal strength associated with local wireless communications between the local wireless access point and the mobile terminal.

8. The system of claim 1 wherein the status information provides location information associated with local wireless communications between the local wireless access point and the mobile terminal.

9. The system of claim 1 wherein the control system is further adapted to initiate an action based on the status information.

10. The system of claim 9 wherein the action is establishing communications with the mobile terminal via the local wireless access point.

11. The system of claim 9 wherein the action is establishing communications with the mobile terminal via another local wireless access point.

12. The system of claim 9 wherein the action is transferring communications with the mobile terminal to another local wireless access point.

13. A system comprising:
at least one packet communication interface to facilitate communications over a packet network;
at least one local wireless communication interface to facilitate communications with mobile terminals within a local wireless coverage area; and
a control system associated with the at least one packet communication interface and the at least one local wireless communication interface and adapted to:
receive from an application running on an entity on the packet network a request for status information bearing on an ability of a mobile terminal to communicate via the at least one local wireless interface; and
send the status information to the application.

14. The system of claim 13 wherein the request identifies the mobile terminal for which the status information is requested.

15. The system of claim 13 wherein the request provides instructions to send current status information.

16. The system of claim 13 wherein the request provides instructions to send the status information when the status information changes.

17. The system of claim 13 wherein the status information indicates whether the mobile terminal is within the local wireless coverage area.

18. The system of claim 13 wherein the status information indicates whether the mobile terminal is within a communication range of the local wireless communication interface.

19. The system of claim 13 wherein the status information provides a signal strength associated with local wireless communications with the mobile terminal.

20. The system of claim 13 wherein the status information provides location information associated with local wireless communications with the mobile terminal.

21. The system of claim 13 wherein the control system and the at least one packet communication interface are provided in a master access point and the at least one local wireless communication interface is provided in one of a plurality of slave access points.

22. A method comprising:
providing at least one packet communication interface to facilitate communication over a packet network;
running an application associated with communications involving a mobile terminal whose access to the packet network may be provided by a local wireless access point;
sending to the local wireless access point a request for status information bearing on an ability of the mobile terminal to communicate via the local wireless access point; and
receiving the status information from the local wireless access point.

23. The method of claim 22 wherein the request identifies the mobile terminal, and wherein the local wireless access point is able to support local wireless communications with a plurality of mobile terminals at any given time.

24. The method of claim 22 wherein the request instructs the local wireless access point to provide current status information.

25. The method of claim 22 wherein the request instructs the local wireless access point to provide the status information when the status information changes.

26. The method of claim 22 wherein the local wireless access point affords a coverage area in which local wireless communications with the mobile terminal are viable and the status information indicates whether the mobile terminal is within the coverage area.

27. The method of claim 22 wherein the status information indicates whether the mobile terminal is within communication range of the local wireless access point.

28. The method of claim 22 wherein the status information provides a signal strength associated with local wireless communications between the local wireless access point and the mobile terminal.

29. The method of claim 22 wherein the status information provides location information associated with local wireless communications between the local wireless access point and the mobile terminal.

30. The method of claim 22 further comprising initiating an action based on the status information.

31. The method of claim 30 wherein the action is establishing communications with the mobile terminal via the local wireless access point.

32. The method of claim 30 wherein the action is establishing communication with the mobile terminal via another local wireless access point.

33. The method of claim 30 wherein the action is transferring communications with the mobile terminal to another local wireless access point.

34. A method comprising:
providing at least one packet communication interface to facilitate communications over a packet network;
providing at least one local wireless communication interface to facilitate communications with mobile terminals within a local wireless coverage area;
receiving from an application running on an entity on the packet network a request for status information bearing on an ability of a mobile terminal to communicate via the at least one local wireless interface; and
sending the status information to the application.

35. The method of claim 34 wherein the request identifies the mobile terminal for which the status information is requested.

36. The method of claim 34 wherein the request provides instructions to send current status information.

37. The method of claim 34 wherein the request provides instructions to send the status information when the status information changes.

38. The method of claim 34 wherein the status information indicates whether the mobile terminal is within the local wireless coverage area.

39. The method of claim 34 wherein the status information indicates whether the mobile terminal is within a communication range of the local wireless communication interface.

40. The method of claim 34 wherein the status information provides a signal strength associated with local wireless communications with the mobile terminal.

41. The method of claim 34 wherein the status information provides location information associated with local wireless communications with the mobile terminal.

* * * * *